United States Patent Office 3,850,917
Patented Nov. 26, 1974

3,850,917
5,7-DIAMINO-SUBSTITUTED THIAZOLO[5,4-d]
PYRIMIDINES AND SALTS THEREOF
Erich Muller, Josef Nickl, Josef Roch, and Berthold Narr, assignors to Boehringer Ingelheim G.m.b.H., Ingelheim am Rhein, Germany
No Drawing. Filed Nov. 9, 1972, Ser. No. 305,128
Claims priority, application Germany, Nov. 11, 1971,
P 21 55 963.7; Oct. 5, 1972, P 22 48 792.9
Int. Cl. C07d 99/10
U.S. Cl. 260—243 B   5 Claims

ABSTRACT OF THE DISCLOSURE

Compounds of the formula

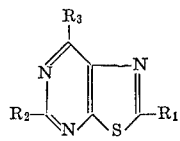

wherein
$R_1$ is hydrogen, phenyl or lower alkyl,
$R_2$ is
 (a) heterocyclic amino selected from among piperazino, where the 4-position is optionally acyl-, carbamoyl-, benzyl-, lower alkyl- or hydroxy-lower alkyl-substituted; hexahydro-1,4-diazepino; hexahydro-1,4-thiazepino; morpholino; thiomorpholino; 1-oxido-thiomorpholino; or 1,1-dioxidothiomorpholino; where each of these heterocycles may optionally have from one to two lower alkyl substituents attached to ring carbon atoms; or
 (b) acyclic amino selected from among (hydroxy-lower alkyl)-amino; di-(hydroxy-lower alkyl)-amino; N-(methoxy-lower alkyl) - N - (hydroxy-lower alkyl)-amino; N-(dihydroxy-lower alkyl)-N-(lower alkyl)-amino; N-(di-hydroxy-lower alkyl)-N-cyclo-alkyl-amino; N-(dihydroxy-lower alkyl)-N-(hydroxy-lower alkyl)-amino; or N-(amino-lower alkyl)-amino; and
$R_3$ is heterocyclic amino selected from among piperazino, where the 4-position is optionally acyl-, carbamoyl-, benzyl-lower alkyl- or hydroxy-lower alkyl-substituted; hexahydro-1,4-diazepino; morphilino; thiomorpholino; 1-oxido-thiomorpholino; or 1,1-dioxido-thiomorpholino; where each of these heterocycles may optionally have from one to two lower alkyl substituents attached to ring carbon atoms;
and their non-toxic, pharmacologically acceptable acid addition salts; the compounds as well as the salts are useful as hypotensives and antithrombotics.

---

This invention relates to novel 5,7-diamino-substituted thiazolo[5,4-d]pyrimidines and acid addition salts thereof, as well as to a method of preparing these compounds.

More particularly, the present invention relates to a novel class of 5,7-disubstituted thiazolo[5.4-d]pyrimidines represented by the formula (I)

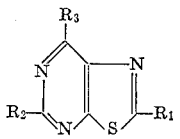

wherein
$R_1$ is hydrogen, phenyl or lower alkyl,
$R_2$ is
 (a) heterocyclic amino selected from among piperazino, where the 4-position is optionally acyl-, carbamoyl-, benzyl-, lower alkyl- or hydroxy-lower alkyl-substituted; hexahydro-1,4-diazepino; hexahydro-1,4-thiazepino; morpholino; thiomorpholino; 1-oxido-thiomorpholino; or 1,1-dioxido-thiomorpholino; where each of these heterocycles may optionally have from one to two lower alkyl substituents attached to ring carbon atoms; or
 (b) acyclic amino selected from among (hydroxy-lower alkyl)-amino; di-(hydroxy-lower alkyl)-amino; N-(methoxy-lower alkyl)-N-(hydroxy-lower alkyl)-amino; N-(dihydroxy-lower alkyl)-N-(lower alkyl)-amino; N-(dihydroxy-lower alkyl)-N-cyclo-alkyl-amino; N-(dihydroxy-lower alkyl)-N-(hydroxy-lower alkyl)-amino; or N-(amino-lower alkyl)-amino; and
$R_3$ is heterocyclic amino selected from among piperazino, where the 4-position is optionally acyl-, carbamoyl-, benzyl-, lower alkyl- or hydroxy-lower alkyl-substituted; hexahydro-1,4-diazepino; hexahydro - 1,4 - thiazepino; morpholino; thiomorpholino; 1-oxido-thiomorpholino; or 1,1-dioxido-thiomorpholino; where each of these heterocycles may optionally have from one to two lower alkyl substituents attached to ring carbon atoms;

and their non-toxic, pharmacologically acceptable acid addition salts.

The compounds embraced by formula I may be prepared by reacting a thiazolo[5,4-d]pyrimidine of the formula

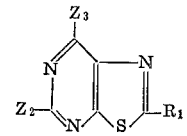

(II)

wherein $R_1$ has the same meanings as in formula I,
one of $Z_2$ and $Z_3$ is an exchangeable substituent, such as halogen or alkyl-, aryl- or aralkyl-substituted hydroxyl, mercapto, sulfinyl or sulfonyl, and
the other of $Z_2$ and $Z_3$ is an exchangeable substituent, as defined above, or has a meaning defined for $R_2$ and $R_3$ in connection with formula I,
with an amine of the formula H—$R_2$ (IIIa)
or
H—$R_3$ (IIIb)

Depending upon the reactivity of the exchangeable substituents $Z_2$ and/or $Z_3$, the reaction is performed at a temperature between 0 and 250° C., advantageously in the presence of a solvent medium and optionally in the presence of an acid-binding agent and in a pressure vessel, if necessary. Examples of suitable solvent media include water, methanol, ethanol, acetone, dioxane, glycol dimethylether, dimethylsulfoxide or an excess of the amine of the formula IIIa and IIIb. Examples of suitable acid-binding agents are inorganic bases, such as sodium carbonate, potassium carbonate or potassium tert.butylate, and tertiary organic bases, such as triethylamine or pyridine; the latter, when provided in sufficient excess, may also serve as solvent media.

If $Z_3$ in formula II is halogen, the exchange takes place at temperatures between 0 and 40° C. If $Z_2$ and/or $Z_3$ are alkyl-, aryl- or aralkyl-substituted sulfinyl or sulfonyl, or when $Z_2$ is halogen, the exchange reaction is preferably performed at a temperature between 100 and 200° C. If $Z_2$ and/or $Z_3$ are alkyl-, aryl- or aralkyl-substituted hydroxyl or mercapto, the exchange reaction is preferably performed at a temperature between 150 and 250° C.

In the case of the preparation of a compound of the formula I wherein $R_2$ and/or $R_3$ are 4-unsubstituted piperazino or hexahydro-1,4-diazepino, it may further be of advantage to protect the imino group in the corresponding starting compound of the formula II and/or one imino group in the corresponding amine of the formula IIIa or IIIb during the reaction with a conventional acyl protective group, such as carbethoxy, formyl, acetyl, carbamoyl, benzoyl or toluenesulfonyl. This protective substituent is subsequently split off again, for example by acid or alkaline hydrolysis in a solvent and up to the boiling point of the solvent. However, the removal of the acyl protective substituent from an S-oxide compound is preferably effected by hydrolysis in the presence of a base, such as potassium hydroxide.

In those instances where the above process yields a compound of the formula I comprising a free imino group, the same may, if desired, be converted into the corresponding N-acyl compound by reaction with the desired acid in the presence of a dehydrating agent, such as cyclohexyl-carbodiimide, or with the corresponding acid anhydride or acid halide.

The compounds embraced by formula I are organic bases and therefore form acid addition salts with inorganic or organic acids. Examples of non-toxic, pharmacologically acceptable acid addition salts are those formed with hydrochloric acid, hydrobromic acid, sulfuric acid, phosphoric acid, lactic acid, citric acid, tartaric acid, maleic acid, 8-chlorotheophylline or the like.

The starting compounds of the formula II are, for the most part, described in the literature or may be prepared by methods described in the literature.

For instance, a 5,7-dihalo-thiazolo[5,4-d]pyrimidine of the formula II may be obtained by reacting a corresponding thiazolo[5,4-d]pyrimidine-5,7-diol with a phosphorus oxyhalide at elevated temperatures, such as at 150–200° C. [see Childress et al.; J.A.C.S. 73, 3862–3864 (1951)]. The thiazolo[5,4-d]pyrimidine-5,7-diol, in turn, is obtained by heating 2-hydroxy-4,6-dimercapto-5-aminobarbituric acid with formic acid or acetic acid anhydride or benzoic acid anhydride, followed by oxidation with hydrogen peroxide.

A 5-halo-7-amino-thiazolo[5,4-d]pyrimidine of the formula II may be obtained, for example, by reacting a corresponding 5,7-dihalo-thiazolo[5,4-d]pyrimidine with the desired amine at relatively low temperatures, such as between 0 and 40° C.

A 5- or 7-monohalo- or 5,7-dihalo-thiazolo[5,4-d]pyrimidine of the formula II may be converted into a correspondingly mercapto- or hydroxyl-substituted thiazolo-[5,4-d]pyrimidine with a corresponding mercapto or hydroxyl compound in the presence of a strong base, such as an alkali metal alcoholate or alkali metal hydride. A mercapto-substituted thiazolo[5,4-d]pyrimidine thus obtained may be converted into the correspondingly sulfinyl- or sulfonyl-substituted thiazolo[5,4-d]pyrimidine by oxidation.

A 5-amino-7-halo-thiazolo[5,4-d]pyrimidine of the formula II may, for example, be obtained by acid hydrolysis of a corresponding 5-amino-7-alkoxy-thiazolo[5,4-d]pyrimidine, followed by reaction of the 5-amino-7-hydroxy-thiazolo[5,4-d]pyrimidine intermediate with a phosphorus oxyhalide at elevated temperatures.

The following examples further illustrate the present invention and will enable others skilled in the art to understand it more completely. It should be understood, however, that the invention is not limited solely to the particular examples given below.

PEPARATION OF STARTING COMPOUNDS OF THE FORMULA II

Example A 5-chloro-7-thiomorpholino-thiazolo[5,4-d]pyrimidine

A solution of 59.5 gm. of sodium bicarbonate in 200 ml. of water was added to a suspension of 48.3 gm. of 5,7-dichloro-thiazolo[5,4-d]pyrimidine in 500 ml. of methanol, and then, while stirring the resulting mixture at room temperature, 29.2 gm. of thiomorpholino were added dropwise thereto; a clear solution was briefly formed. After one hour the crystalline precipitate which had formed was collected by vacuum filtration, washed with water, dried and recrystallized from gasoline (petroleum fraction b.p. 100–140° C.). 39.0 gm. (61% of theory) of 5-chloro-7-thiomorpholino-thiazolo[5,4-d]pyrimidine, m.p. 169–170° C., were obtained.

Example B 5-phenoxy-7-thiomorpholino-thiazolo[5,4-d]pyrimidine

A mixture consisting of 5.4 gm. of 5-chloro-7-thiomorpholino-thiazolo[5,4-d]pyrimidine, 3.0 gm. of phenol, 2.8 gm. of potassium tert.butylate and 15 ml. of dimethylformamide was heated at its boiling point for six hours. Thereafter, the reaction mixture was allowed to cool, was then admixed with 20 ml. of water, and the precipitate formed thereby was collected by vacuum filtration, washed with water and ethanol, and recrystallized from toluene in the presence of activated charcoal. 5.0 gm. (76% of theory) of 5-phenoxy-7-thiomorpholino-thiazolo[5,4-d]pyrimidine, m.p. 166° C., were obtained.

Example C 5-methylmercapto-7-thiomorpholino-thiazolo[5,4-d]pyrimidine 5.4 gm. of 5-chloro-7-thiomorpholino-thiazolo[5,4-d]pyrimidine were added to a mixture consisting of a solution of 0.7 gm. of sodium in 25 ml. of methanol and 1.5 gm. of methylmercaptan (taken as liquid from a pressure bottle), and the resulting mixture was refluxed for eight hours. Thereafter, the reaction mixture was allowed to cool and was then poured into 25 ml. of water, the resulting crystalline slurry was vacuum-filtered, and the filter cake was washed with water and a little methanol and then recrystallized from toluene in the presence of activated charcoal, the crystallization being brought to completion by addition of three times the amount of petroleum ether. 3.5 gm. (62% of theory) of 5-methylmercapto - 7 - thiomorpholino-thiazolo[5,4-d]pyrimidine, m.p. 138.5–141° C., were obtained.

Example D 5-methylsulfinyl-7-(1'-oxido-thiomorpholino)-thiazolo-[5,4-d]pyrimidine 1.14 gm. of 5-methylmercapto-7-thiomorpholino-thiazolo[5,4-d]pyrimidine were suspended in 20 ml. of glacial acetic acid and, while stirring the suspension, it was admixed with 1.0 gm. of 30% hydrogen peroxide. After about 10 minutes the reaction mixture, accompanied by an internal evolution of heat, changed into a light-yellow solution, and this solution was stirred and heated for five hours more at 50° C. Thereafter, the solution was admixed with 20 ml. of ethanol, and the mixture was evaporated to dryness in vacuo. The residue was dissolved in 20 ml. of solvent mixture consisting of benzene, ethanol and concentrated ammonia (70:30:3), and the solution was chromatographed with the same solvent mixture on silicagel column (particle size 0.2–0.5 mm.). Those fractions which contained the main spot of the reaction mixture in the thin-layer chromatogram (silica gel with fluorescent dye and the same solvent mixture) were combined and evaporated. 0.95 gm. (74.8% of theory) of white crystalline 5-methylsulfinyl-7-(1'-oxido-thiomorpholino)-thiazolo[5,4-d]pyrimidine, m.p. 238–239° C., was obtained.

Example E 5-methylsulfonyl-7-(1',1'-dioxido-thiomorpholino)-thiazolo[5,4-d]pyrimidine 568 mgm. of 5-methylmercapto-7-thiomorpholino-thiazolo[5,4-d]pyrimidine were suspended in 20 ml. of glacial acetic acid, and the suspension was admixed with 1.13 gm. of 30% hydrogen peroxide. After about 10 minutes a yellow solution was formed which was then heated for 15 hours at 70° C., during which time a white crystalline precipitate was formed. The reaction mixture was allowed to cool, and then the precipitate was collected by vacuum filtration, washed with water and dried over calcium chloride. 470 mgm. (67.5% of theory) of 5-methylsulfonyl-7 - (1',1' - dioxido - thiomorpholino) - thiazolo[5,4-d]pyrimidine, m.p. 298–299° C., were obtained.

Example F 5-thiomorpholino-7-bromo-thiazolo[5,4-d]pyrimidine (a) 20.5 gm. of 5,7-dichloro-thiazolo[5,4-d]pyrimidine were added to a solution of 10.5 gm. of potassium methylate in 500 ml. of methanol, while stirring, and the resulting mixture was gradually heated to 50° C. over a period of 90 minutes. Thereafter, the major amount of the methanol was distilled out of the reaction solution, the remainder was poured over ice, and the resulting aqueous mixture was extracted three times with chloroform. The combined chloroform extracts were dried over sodium sulfate and then filtered, and the solvent was distilled out of the filtrate. The residue was recrystallized from gasoline/ethyl acetate (1:1), yielding 16.4 gm. (81.5% of theory) of white crystalline 5-chloro - 7 - methoxy-thiazolo[5,4-d]pyrimidine, m.p. 137–141° C.

(b) 16.4 gm. of 5-chloro-7-methoxy-thiazolo[5,4-d]pyrimidine were added to a solution of 29.5 gm. of thiomorpholine in 100 ml. of dioxane, and the mixture was heated to 90° C., whereby a crystalline precipitate formed after a short time. After keeping the reaction mixture at this temperature for five minutes, it was cooled to room temperature and then poured into one liter of water. The crystalline precipitate formed thereby was collected by vacuum filtration, dried in the air at 80° C. and recrystallized from ethyl acetate. 17.1 gm. (80% of theory) of beige crystalline 5-thiomorpholino - 7 - methoxy-thiazolo-[5,4-d]pyrimidine, m.p. 169.5–172.5° C., were obtained.

(c) A mixture consisting of 16.1 gm. of 5-thiomorpholino-7-methoxy-thiazolo[5,4-d]pyrimidine and 100 ml. of aqueous 20% hydrochloric acid was heated at its boiling point for 30 minutes, then cooled to room temperature, diluted to twice its volume with water, and buffered to pH 4.0 with sodium acetate. The buffered solution was extracted with chloroform, the solvent was distilled out of the chloroform extract, and the residue was recrystallized from ethyl acetate. 5.2 gm. (34% of theory) of coffee-brown crystalline 5-thiomorpholino-7-hydroxy-thiazolo-[5,4-d]pyrimidine, m.p. 319–324° C. (decomp.), were obtained.

(d) A mixture consisting of 5.2 gm. of 5-thiomorpholino-7-hydroxy-thiazolo[5,4-d]pyrimidine and 40 ml. of phosphorus oxybromide was heated for 2½ hours on an oil bath at 130° C., while stirring, whereby the mixture turned dark-brown to black. Thereafter, the excess, unreacted phosphorus oxybromide was distilled off in a water aspirator vacuum, the residue was digested with chloroform, the mixture was filtered, and the solvent was evaporated from the filtrate. The residue was recrystallized from a 1:1-mixture of gasoline (b.p. 60–80° C.) and ethyl acetate, yielding 1.7 gm. (26% of theory) of light-yellow crystalline 5-thiomorpholino-7-bromo-thiazolo[5,4-d]pyrimidine, m.p. 185.5–189.0° C.

PREPARATION OF END PRODUCTS OF THE FORMULA I

Example 1

5-piperazino-7-thiomorpholino-thiazolo[5,4-d] pyrimidine and its dihydrochloride 19.0 gm. of 5-chloro-7-thiomorpholino-thiazolo[5,4-d]pyrimidine were gradually introduced into 38.0 gm. of molten anhydrous piperazine at 140° C., and the resulting mixture was kept at that temperature for 40 minutes. Thereafter, the major amount of the excess, unreacted piperazine was removed by sublimation in a water aspirator vacuum, the residual reaction mixture was introduced into water, and the aqueous mixture was extracted with chloroform. For removal of the remaining amount of unreacted piperazine, the chloroform phase was washed three times with water; the washed chloroform solution was then evaporated to dryness, the residue was taken up in 2N hydrochloric acid, and the undissolved matter was separated by filtration. The filtrate was admixed with activated charcoal, again filtered, and the filtrate was made alkaline with sodium hydroxide. The precipitate formed thereby was collected by vacuum filtration and recrystallized from ethanol, yielding the crystalline free base of the formula

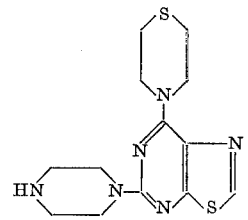

which had a melting point of 161–167° C.

The base was dissolved in ethanol, and the resulting solution was admixed with ethereal hydrochloric acid until no further precipitate formed. The precipitate was collected by vacuum filtration, washed with a small amount of ethanol and ether, and dried in an exsiccator over sulfuric acid and caustic soda, yielding 18.4 gm. (68% of theory) of the dihydrochloride which had a melting point of 265–271° C.

Example 2

5-piperazino-7-thiomorpholino-thiazolo[5,4-d] pyrimidine (a) 2.7 gm. of 5-chloro-7-thiomorpholino-thiazolo [5,4-d]pyrimidine were admixed with 2.0 gm. of N-carbethoxy-piperazine and 2.0 gm. of triethylamine, and the mixture was heated for 30 minutes at 140° C. Thereafter, the reaction mixture was allowed to cool and was then admixed with water, and the crystalline precipitate formed thereby was collected by vacuum filtration and recrystallized from ethanol, yielding 3.3 gm. of 5-(N'-carbethoxy-piperazino) - 7 - thiomorpholino-thiazolo[5,4-d]pyrimidine, m.p. 156–158° C.

(b) A mixture consisting of 394 gm. of 5-(N'-carbethoxy-piperazino) - 7 - thiomorpholino-thiazolo[5,4-d] pyrimidine, 800 mgm. of potassium hydroxide and 20 ml. of isopropanol was refluxed for six hours. Thereafter, the isopropanol was evaporated, the residue was admixed with water, and the aqueous mixture was extracted with chloroform. The chloroform extract solution was dried over anhydrous sodium sulfate, then admixed with activated charcoal and filtered. The chloroform was evaporated from the filtrate, leaving 210 mgm. (65.3% of theory) of pure white crystalline 5-piperazino-7-thiomorpholino-thiazolo[5,4-d]pyrimidine which had a melting point of 161–166° C.

Example 3

Using a procedure analogous to that described in Example 2, 50% of theory of 5-piperazino-7-(1'-oxidothiomorpholino)-thiazolo[5,4-d]pyrimidine, m.p. 194–197° C., of the formula

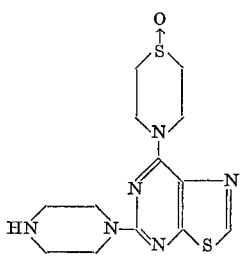

was obtained from 5-(N'-carbethoxy-piperazino)-7-(1'-oxido-thiomorpholino)-thiazolo[5,4-d]pyrimidine (m.p. 218–222° C.).

Example 4

Using a procedure analogous to that described in Example 2, 60% of theory of 5-thiomorpholino-7-piperazinothiazolo[5,4-d]pyrimidine of the formula

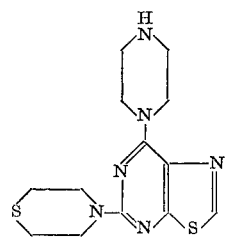

was obtained from 5-thiomorpholino-7-(N'-carbethoxy-piperazino)-thiazolo[5,4-d]pyrimidine (m.p. 165–167° C.).

Its dihydrochloride had a melting point of 206° C. (decomp.).

Example 5

5-piperazino-7-(1'-oxido-thiomorpholino)-thiazolo[5,4-d]pyrimidine 200 mgm. of 5-methylsulfinyl-7-(1'-oxido-thiomorpholino)-thiazolo[5,4-d]pyrimidine were admixed with 800 mgm. of piperazine, and the mixture was heated for 15 minutes at 150° C. in a sealed tube. Thereafter, a substantial portion of the excess, unreacted piperazine was removed by sublimation. The residue was taken up in 2N hydrochloric acid, the acid solution was filtered with a small amount of charcoal, and the filtrate was made alkaline with 2N sodium hydroxide and was extracted with chloroform. The chloroform extract solution was dried over anhydrous sodium sulfate and then evaporated, and the residue was recrystallized from ethanol, yielding 184 mgm. (86% of theory) of 5-piperazino-7-(1'-oxido-thiomorpholino) - thiazolo[5,4-d]pyrimidine, m.p. 195–197° C. Its dihydrochloride had a melting point of 257–261° C.

Example 6

Using a procedure analogous to that described in Example 5, 1.5 gm. (77% of theory) of 5-piperazino-7-(1',1'-dioxido - thiomorpholino) - thiazolo[5,4-d]pyrimidine, m.p. 205–207° C., of the formula

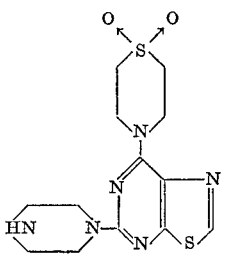

were obtained from 5-methylsulfonyl-7-(1',1'-dioxido-thiomorpholino)-thiazolo[5,4-d]pyrimidine (m.p. 298–299° C.) and piperazine.

Example 7

Using a procedure analogous to that described in Example 2, 69.7% of theory of 5-(1'-oxido-thiomorpholino)-7-(N'-carbethoxy - piperazino) - thiazolo[5,4-d]pyrimidine, m.p. 281–283° C., of the formula

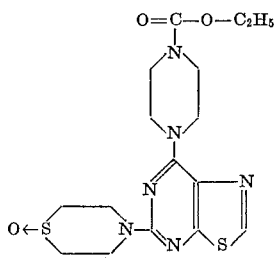

was obtained from 5-chloro-7-(N'-carbethoxy-piperazino)-thiazolo[5,4-d]pyrimidine (m.p. 184–187° C.) and thiomorpholine-S-oxide.

Example 8

Using a procedure analogous to that described in Example 2, 77% of theory of 5-(1',1'-dioxido-thiomorpholino)-7-(N'-carbethoxy - piperazino) - thiazolo[5,4-d]pyrimidine, m.p. 253–254° C., of the formula

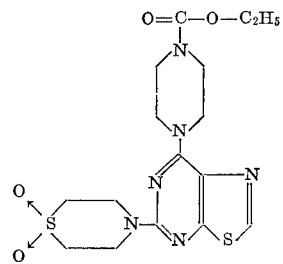

was obtained from 5-chloro-7-(N'-carbethoxy-piperazino)-thiazolo[5,4-d]pyrimidine (m.p. 184–187° C.) and thiomorpholine-S,S-dioxide.

Example 9

5-(1',1'-dioxido-thiomorpholino)-7-piperazine-thiazolo[5,4-d]pyrimidine hydrochloride A mixture consisting of 3.0 gm. of 5-(1',1'-dioxido-thiomorpholino) - 7-(N'-carbethoxy-piperazino)thiazolo[5,4-d]pyrimidine and 100 ml. of concentrated hydrochloric acid was refluxed for 10 hours. Thereafter, the hydrochloric acid was completely distilled off, and the residue was recrystallized from aqueous 75% ethanol in the presence of activated charcoal. The white crystalline substance thus obtained was dried in an exsiccator over concentrated sulfuric acid and potassium hydroxide, yielding 1.9 gm. (69% of theory) of the monohydrochloride of the formula

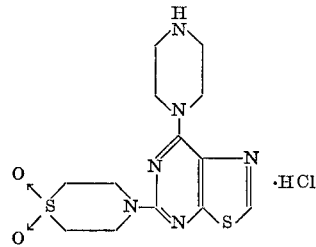

which had a melting point of 305–308° C.

Example 10

Using a procedure analogous to that described in Example 2, 65% of theory of 5-[N'-(p-toluene-sulfonyl)- piperazino] - 7 - thiomorpholino-thiazolo[5,4-d]pyrimidine, m.p. 230° C., of the formula

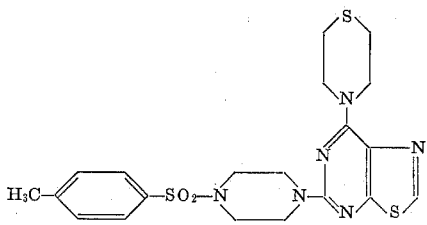

was obtained from 5-chloro-7-thiomorpholino-thiazolo-[5,4-d]pyrimidine (m.p. 169–170° C.) and N-(p-toluenesulfonyl)-piperazine.

Example 11

Using a procedure analogous to that described in Example 2, 73% of theory of 5-[N'-(p-toluene-sulfonyl)-piperazine] - 7 - (1' - oxido-thiomorpholino)-thiazolo-[5,4-d]pyrimidine, m.p. 237–240° C., of the formula

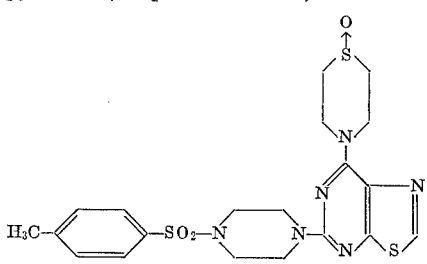

was obtained from 5-chloro-7-(1'-oxido-thiomorpholino)-thiazolo[5,4-d]pyrimidine (m.p. 261–266° C.) and N-(p-toluene-sulfonyl)-piperazine.

Example 12

Using a procedure analogous to that described in Example 2, 82% of theory of 5-(N'-benzoyl-piperazino)-7-thiomorpholino-thiazolo[5,4-d]pyrimidine, m.p. 198–200° C., of the formula

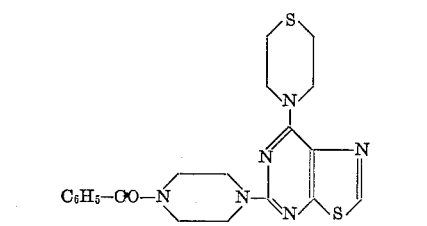

was obtained from 5-chloro-7-thiomorpholino-thiazolo-[5,4-d]pyrimidine (m.p. 169–170° C.) and N-benzoyl-piperazine.

Example 13

Using a procedure analogous to that described in Example 2, 74% of theory of 5-(N'-acetyl-piperazino)-7-thiomorpholino-thiazolo[5,4 - d]pyrimidine, m.p. 183–186° C., of the formula

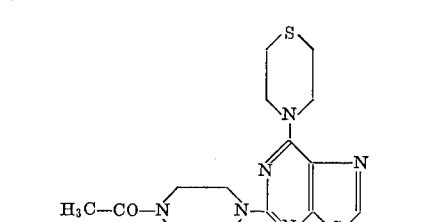

was obtained from 5-chloro-7-thiomorpholino-thiazolo [5,4-d]pyrimidine and N-acetyl-piperazine.

Example 14

Using a procedure analogous to that described in Example 2, 51% of theory of 5-(N'-benzoyl-piperazino)-7- (1' - oxido-thiomorpholino)-thiazolo[5,4 - d]pyrimidine, m.p. 174–176° C., of the formula

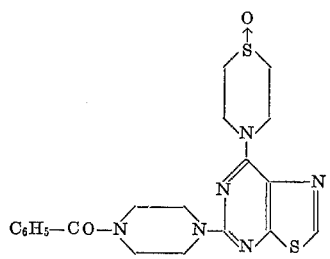

was obtained from 5-chloro-7-(1'-oxido-thiomorpholino) thiazolo[5,4-d]pyrimidine (m.p. 261–266° C.) and N-benzoyl-piperazine.

Example 15

Using a procedure analogous to that described in Example 2, 66% of theory of 5-(N'-acetyl-piperazino)-7- (1' - oxido-thiomorpholino)-thiazolo[5,4 - d]pyrimidine, m.p. 230–236° C., of the formula

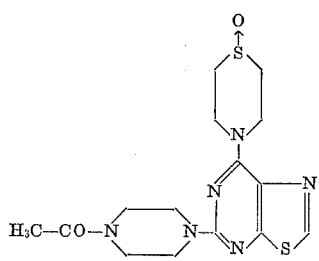

was obtained from 5-chloro-7-(1'-oxido-thiomorpholino) thiazolo[5,4-d]pyrimidine (m.p. 261–266° C.) and N-acetyl-piperazine.

Example 16

Using a procedure analogous to that described in Example 1, 80% of theory of 5-(N'-benzyl-piperazino)-7-thiomorpholino-thiazolo[5,4 - d]pyrimidine, m.p. 133–136° C., of the formula

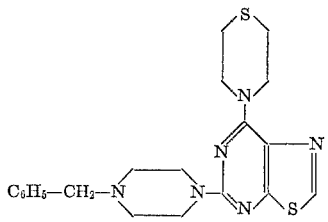

was obtained from 5-chloro-7-thiomorpholino-thiazolo [5,4-d]pyrimidine and N-benzyl-piperazine.

Example 17

Using a procedure analogous to that described in Example 1, 90% of theory of 5-(N'-benzyl-piperazino)-7- (1' - oxido-thiomorpholino)-thiazolo[5,4 - d]pyrimidine, m.p. 173–174° C., was obtained from 5 - chloro-7-(1'-oxido-thiomorpholino)-thiazolo[5,4-d]pyrimidine and N-benzyl-piperazine.

Example 18

Using a procedure analogous to that described in Example 1, 98% of theory of 5-(N'-benzyl-piperazino)-7- (1',1' - dioxido-thiomorpholino)-thiazolo[5,4 - d]pyrimidine, m.p. 203–205° C., was obtained from 5-chloro-7- (1',1' - dioxido-thiomorpholino-thiazolo[5,4 - d]pyrimidine and N-benzyl-piperazine.

Example 19

Using a procedure analogous to that described in Example 1, 86% of theory of 5-(N'-methyl-piperazino)-7-

(1' - oxido-thiomorpholino)-thiazolo[5,4 - d]pyrimidine, m.p. 252–254° C., of the formula

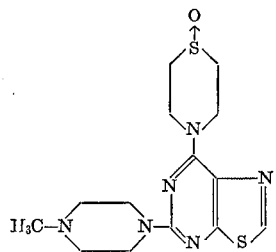

was obtained from 5-chloro-7-(1'-oxido-thiomorpholino)-thiazolo[5,4-d]pyrimidine and N-methyl-piperazine.

Example 20

Using a procedure analogous to that described in Example 1, 75% of theory of 5-(N'-methyl-piperazino)-7-(1',1' - dioxido-thiomorpholino)-thiazolo[5,4 - d]pyrimidine, m.p. 118–120° C., was obtained from 5-chloro-7-(1',1' - dioxido-thiomorpholino)-thiazolo[5,4 - d]pyrimidine and N-methyl-piperazine.

Example 21

Using a procedure analogous to that described in Example 1, 52% of theory of 5 - [N'-(β-hydroxy-ethyl)-piperazino] - 7 - (1' - oxido-thiomorpholino)-thiazolo[5,4-d]pyrimidine, m.p. 182–185° C., of the formula

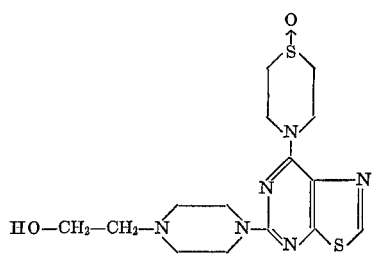

was obtained from 5-chloro-7-(1'-oxido-thiomorpholino)-thiazolo[5,4 - d]pyrimidine and N-(β - hydroxy-ethyl)-piperazine.

Example 22

Using a procedure analogous to that described in Example 1, 49% of theory of 5 - [N'-(β - hydroxy-ethyl)-piperazino] - 7 - (1',1'-dioxido-thiomorpholino)-thiazolo[5,4-d]pyrimidine dihydrochloride, m.p. 297–299° C., was obtained from 5-chloro-7-(1',1'-dioxido-thiomorpholino)-thiazolo[5,4 - d]pyrimidine and N-(β - hydroxy-ethyl)-piperazine.

Example 23

Using a procedure analogous to that described in Example 1, 68% of theory of 5-diethanolamino-7-thiomorpholino-thiazolo[5,4 - d]pyrimidine hydrochloride, m.p. 197–199° C., of the formula

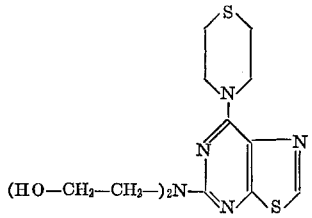

was obtained from 5-chloro-7-thiomorpholino-thiazolo[5,4-d]pyrimidine and diethanolamine.

Example 24

Using a procedure analogous to that described in Example 1, 48% of theory of 5-diethanolamino-7-(1'-oxidothiomorpholino) - thiazolo[5,4-d]pyrimidine, m.p. 168–170° C., was obtained from 5-chloro-7-(1'-oxido-thiomorpholino)-thiazolo[5,4-d]pyrimidine and diethanolamine.

Example 25

Using a procedure analogous to that described in Example 1, 69% of theory of 5-diethanolamino-7-(1',1'-dioxido-thiomorpholino)-thiazolo[5,4-d]pyrimidine, m.p. 146–148° C., was obtained from 5-chloro-7-(1',1'-dioxido-thiomorpholino)-thiazolo[5,4-d]pyrimidine and diethanolamine.

Example 26

Using a procedure analogous to that described in Example 1, 82% of theory of 5-piperazino-7-(hexahydro-1',4'-thiazepino)-thiazolo[5,4-d]pyrimidine dihydrochloride, m.p. 207–217° C., of the formula

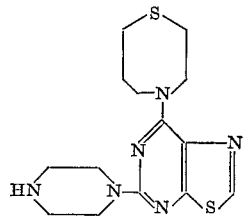

was obtained from 5-chloro-7-(hexahydro-1,4-thiazepino)-thiazolo[5,4-d]pyrimidine, m.p. 117–119° C., and piperazine.

Example 27

Using procedures analogous to those described in Examples A and 1, 45% of theory of 5-piperazino-7-(2'-methyl-thiomorpholino)-thiazolo[5,4-d]pyrimidine dihydrochloride, m.p. 205–238° C. (decomp.), of the formula

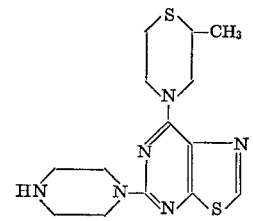

was obtained from 5,7-dichloro-thiazolo[5,4-d]pyrimidine, 2-methyl-thiomorpholine and piperazine.

Example 28

Using a procedure analogous to that described in Example 1, 87% of theory of 5-(hexahydro-1',4'-diazepino) - 7 - (1'' - oxido - thiomorpholino) - thiazolo-[5,4-d]pyrimidine dihydrochloride, m.p. 256–260° C., of the formula

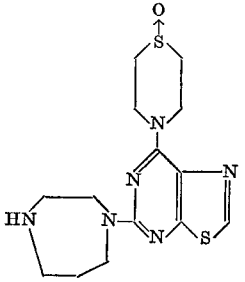

was obtained from 5-chloro-7-(1'-oxido-thiomorpholino)-thiazolo[5,4-d]pyrimidine and hexahydro-1,4-diazepine.

Example 29

Using a procedure analogous to that described in Example 1, 40% of theory of 5,7-di-(1'-oxido-thiomorpholino)-thiazolo[5,4-d]pyrimidine hydrochloride, m.p. 239–240° C., of the formula

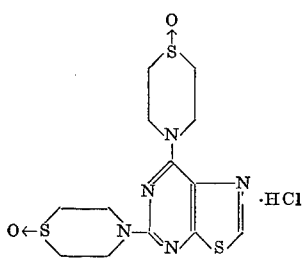

was obtained from 5-chloro-7-(1'-oxido-thiomorpholino-thiazolo[5,4-d]pyrimidine and thiomorpholine-S-oxide.

Example 30

Using a procedure analogous to that described in Example 1, 44% of theory of 5,7-di-(1',1'-dioxido-thiomorpholino)-thiazolo[5,4-d]pyrimidine, m.p. 282–284° C., was obtained from 5-chloro-7-(1',1'-dioxido-thiomorpholino-thiazolo[5,4-d]pyrimidine and thiomorpholino-S,S-dioxide.

Example 31

Using a procedure analogous to that described in Example 1, 44% of theory of 2-methyl-5-piperazino-7-thiomorpholino-thiazolo[5,4-d]pyrimidine dihydrochloride, m.p. 268–270° C., of the formula

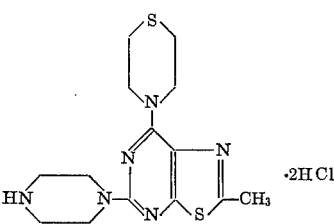

was obtained from 2-methyl-5-chloro-7-thiomorpholino-thiazolo[5,4-d]pyrimidine, m.p. 166° C., and piperazine.

Example 32

Using a procedure analogous to that described in Example 1, 68% of theory of 2-methyl-5-piperazino-7-(1'-oxido-thiomorpholino)-thiazolo[5,4-d]pyrimidine, m.p. 200–202° C., was obtained from 2-methyl-5-chloro-7-(1'-oxido-thiomorpholino)-thiazolo[5,4-d]pyrimidine (m.p. 218–220° C.) and piperazine.

Example 33

Using a procedure analogous to that described in Example 1, 66% of theory of 2-phenyl-5-piperazino-7-(1'-oxido-thiomorpholino)-thiazolo[5,4-d]pyrimidine, m.p. 240–244° C., of the formula

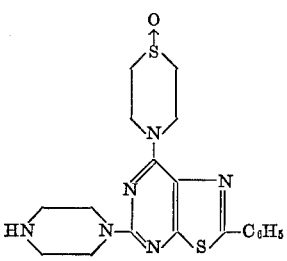

was obtained from 2-phenyl-5-chloro-7-(1'-oxido-thiomorpholino)-thiazolo[5,4-d]pyrimidine (m.p. 268–273° C.) and piperazine.

Example 34

Using a procedure analogous to that described in Example 1, 48% of theory of 5-piperazino-7-morpholino-thiazolo[5,4-d]pyrimidine hydrochloride, m.p. 242–243° C., of the formula

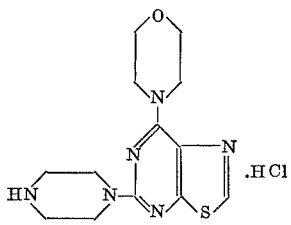

was obtained from 5 - chloro-7-morpholino-thiazolo[5,4-d]pyrimidine (m.p. 160–161° C.) and piperazine.

Example 35

Using a procedure analogous to that described in Example 1, 69% of theory of 5-(N'-methyl-piperazino)-7-morpholino - thiazolo[5,4 - d]pyrimidine hydrochloride, m.p. 261–267° C., was obtained from 5-chloro-7-morpholino-thiazolo[5,4-d]pyrimidine, m.p. 160–161° C., and N-methyl-piperazine.

Example 36

Using a procedure analogous to that described in Example 1, 69% of theory of 5-morpholino-7-(N'-methyl-piperazino) - thiazolo[5,4-d]pyrimidine dihydrochloride, m.p. 261–267° C., was obtained from 5-chloro-7-(N'-methyl-piperazino)-thiazolo[5,4-d]pyrimidine (m.p. 285–320° C.; decomp.) and morpholine.

Example 37

Using a procedure analogous to that described in Example 1, 24% of theory of 5-[N-(β-amino-ethyl)-amino]-7-morpholino-thiazolo[5,4-d]pyrimidine dihydrochloride, m.p. 252–255° C., of the formula

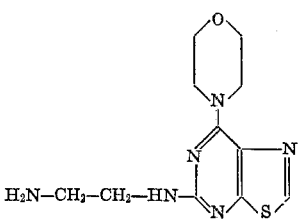

was obtained from 5 - chloro - 7 - morpholino-thiazolo-[5,4-d]pyrimidine, m.p. 160–161° C., and ethylenediamine.

Example 38

Using a procedure analogous to that described in Example 1, 61% of theory of 5-[N'-(β-hydroxy-ethyl)-piperazino] - 7 - morpholino-thiazolo[5,4-d]pyrimidine dihydrochloride, m.p. 252–255° C., was obtained from 5-chloro - 7 - morpholino-thiazolo[5,4-d]pyrimidine and N-(β-hydroxy-ethyl)-piperazine.

Example 39

Using a procedure analogous to that described in Example 1, 57% of theory of 5-[N-methyl - N - (4'-hydroxy-n-butyl)-amino] - 7 - morpholino-thiazolo[5,4-d]pyrimidine hydrochloride, m.p. 216–218° C., of the formula

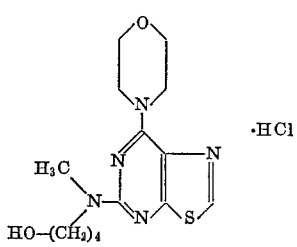

was obtained from 5-chloro - 7 - morpholino-thiazolo-[5,4-d]pyrimidine and N-methyl-N-(4-hydroxy-n-butyl)-amine.

Example 40

Using a procedure analogous to that described in Example 1, 24% of theory of 5-[N-ethyl - N - (3'-hydroxy-n-propyl)-amino] - 7 - morpholino-thiazolo[5,4-d]pyrimidine hydrochloride, m.p. 196–201° C., was obtained from 5-chloro - 7 - morpholino-thiazolo[5,4-d]pyrimidine and N-ethyl-N-(3-hydroxy-n-propyl)-amine.

Example 41

Using a procedure analogous to that described in Example 1, 43% of theory of 5-[N-methyl - N - (β-hydroxy-ethyl)-amino] - 7 - morpholino-thiazolo[5,4-d]pyrimidine hydrochloride, m.p. 218–224° C., was obtained from 5-chloro - 7 - morpholino-thiazolo[5,4-d]pyrimidine and N-methly-ethanolamine.

Example 42

Using a procedure analogous to that described in Example 1, 45% of theory of 5-[N-(β-hydroxy-ethyl)-N-(5' - hydroxy-pentyl)-amino] - 7 - morpholino-thiazolo[5,4-d]pyrimidine hydrochloride, m.p. 198–206° C., was obtained from 5-chloro - 7 - morpholino-thiazolo[5,4-d]pyrimidine and N - (β - hydroxy-ethyl) - N - (5-hydroxy-n-pentyl)-amine.

Example 43

Using a procedure analogous to that described in Example 1, 42% of theory of 5-diethanolamino - 7 - morpholinothiazolo[5,4 - d]pyrimidine hydrochloride, m.p. 200–205° C., was obtained from 5-chloro - 7 - morpholino-thiazolo[5,4-d]pyrimidine and diethanolamine.

Example 44

Using a procedure analogous to that described in Example 1, 39% of theory of 5-[bis-(3' - hydroxy-n-propyy)-amino] - 7 - morpholino-thiazolo[5,4-d]pyrimidine hydrochloride, m.p. 201–203° C., was obtained from 5-chloro-7 - morpholinothiazolo[5,4-d]pyrimidine and dipropanolamine.

Example 45

Using a procedure analogous to that described in Example 1, 65% of theory of 2-phenyl - 5 - piperazino-7 - morpholino - thiazolo[5,4-d]pyrimidine dihydrochloride, m.p. 303–306° C., was obtained from 2-phenyl-5-chloro - 7 - morpholino-thiazolo[5,4-d]pyrimidine (m.p. 231–236° C.) and piperazine.

Example 46

Using a procedure analogous to that described in Example 1, 45% of theory of 5,7-bis-(N'-methyl-piperazino)-thiazolo[5,4-d]pyrimidine trihydrochloride, m.p. 305–309° C., was obtained from 5-chloro - 7 - (N'-methyl-piperazino)-thiazolo[5,4-d]pyrimidine (m.p. 285–320° C.; decomp.) and N-methylpiperazine.

Example 47

Using a procedure analogous to that described in Example 2, 41% of theory of 5-(1'-oxido-thiomorpholino)-7 - piperazino - thiazolo[5,4-d]pyrimidine dihydrochloride, m.p. 235° C. (decomp.), was obtained from 5-(1'oxido-thiomorpholino) - 7 - (N' - carbethoxy - piperazino)-thiazolo[5,4-d]pyrimidine (m.p. 281–283° C.).

Example 48

5,7-di-(1'-oxido-thiomorpholino)-thiazolo[5,4-d]pyrimidine and its hydrochloride A mixture consisting of 10.2 gm. of 5,7-dichlorothiazolo[5,4-d]pyrimidine and 26.4 gm. of thiomorpholine-S-oxide was heated for 15 minutes at 150° C. Thereafter, the reaction mixture was taken up in water, and the resulting aqueous solution was made alkaline with sodium hydroxide and was then extracted with chloroform. The combined chloroform extracts were washed with a little water, admixed with activated charcoal and filtered, and the filtrate was evaporated. The residue was recrystallized from methanol, yielding the free base, 5,7-di-(1'-oxido-thiomorpholino)-thiazolo[5,4 - d]pyrimidine, which was then dissolved in methanol. The resulting solution was acidified with methanolic hydrochloric acid, and the precipitate formed thereby was collected by vacuum filtration and dried in a vacuum-desiccator over concentrated sulfuric acid, yielding 14.9 gm. (74% of theory) of the white crystalline hydrochloride of the formula

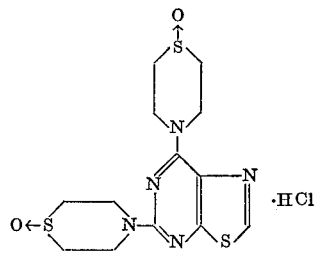

which had a melting point of 239–240° C.

Example 49

5-[di-(γ-hydroxy-n-propyl)-amino]-7-(1'-oxido-thiomorpholino) - thiazolo[5,4-d]pyrimidine and its hydrochloride A mixture consisting of 5.7 gm. of 5-chloro-7-(1'-oxido-thiomorpholino)-thiazolo[5,4-d]pyrimidine and 5.4 gm. of dipropanolamine was heated for 20 minutes at 140° C. Thereafter, the reaction mixture was poured into 20 ml. of water, and the crystalline precipitate formed thereby was collected by vacuum filtration and recrystallized from methanol, yielding the free base, 5-[di-(γ-hydroxy-n-propyl)-amino] - 7 - (1'-oxido-thiomorpholino)-thiazolo[5,4-d]pyrimidine. The base was redissolved in hot methanol, and the resulting hot solution was acidified with methanolic hydrochloric acid and then allowed to cool. The crystalline precipitate formed thereby was collected by vacuum filtration, washed with a little methanol and dried in the air, yielding 5.2 gm. (63% of theory) of the monohydrochloride of the formula

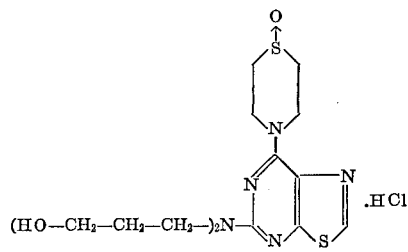

which had a melting point of 223–225° C.

Example 50

Using a procedure analogous to that described in Example 49, 5-morpholino-7-(1'-oxido - thiomorpholino)-thiazolo[5,4-d]pyrimidine hydrochloride, m.p. 239–241° C., of the formula

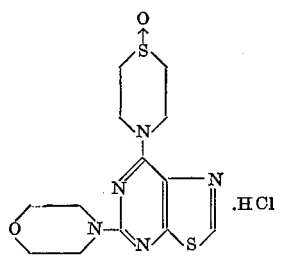

was prepared from 5-chloro-7-(1'-oxido-thiomorpholino)-thiazolo[5,4-d]pyrimidine and morpholine.

Example 51

Using a procedure analogous to that described in Example 49, 5-thiomorpholino-7-(1'-oxido-thiomorpholino)-thiazolo[5,4-d]pyrimidine hydrochloride, m.p. 214–216° C., was prepared from 5-chloro-7-(1'-oxido-thiomorpholino)-thiazolo[5,4-d]pyrimidine and thiomorpholine.

Example 52

Using a procedure analogous to that described in Example 49, 5-ethanolamino-7-(1'-oxido-thiomorpholino)-thiazolo[5,4-d]pyrimidine hydrochloride, m.p. 244–246° C., was prepared from 5-chloro-7-(1'-oxido-thiomorpholino)-thiazolo[5,4-d]pyrimidine and ethanolamine.

Example 53

Using a procedure analogous to that described in Example 49, 5 - (N-methyl-ethanolamino)-7-(1'-oxido-thiomorphilino)-thiazolo[5,4-d]pyrimidine hydrochloride, m.p. 233–235° C., of the formula

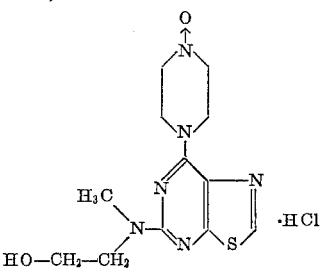

was prepared from 5-chloro-7(1'-oxido-thiomorpholino)-thiazolo[5,4-d]pyrimidine and N-methyl-ethanolamine.

Example 54

Using a procedure analogous to that described in Example 49, 5'-[bis-(β-hydroxy-n-propyl)-amino] - 7 - (1'-oxidothiomorpholino)-thiazolo[5,4 - d]pyrimidine hydrochloride, m.p. 235–238° C., of the formula

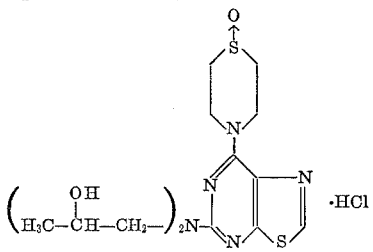

was prepared from 5-chloro-7-(1'-oxido-thiomorpholino)-thiazol[5,4-d]pyrimidine and diisopropanolamine.

Example 55

Using a procedure analogous to that described in Example 49, 5-[(β-amino-ethyl)-amino]-7-(1'-oxido - triomorpholino) - thiazolo[5,4-d]pyrimidine dihydrochloride, m.p. 251–253° C., was prepared from 5-chloro-7-(1'-oxido-thiomorpholino))-thiazolo[5,4 - d]pyrimidine and ethylenediamine.

Example 56

Using a procedure analogous to that described in Example 49, 5-[N-ethyl-(4-hydroxy-n-butyl)-amino]-7-(1'-oxido-thiomorpholino)-thiazolo[5,4 - d]pyrimidine hydrochloride, m.p. 219–221° C., of the formula

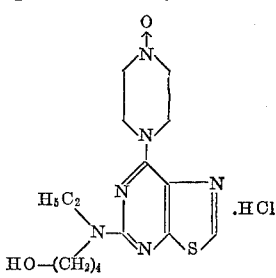

was prepared from 5-chloro-7-(1' - oxido - thiomorpholino)-thiazolo[5,4-d]pyrimidine and N-ethyl-butanolamine.

Example 57

Using a procedure analogous to that described in Example 49, 5-[N-(β-hydroxy-ethyl)-N-(β-methoxy-ethyl)-amino]-7-(1' - oxido - thiomorpholino)thiazolo[5,4 - d]pyrimidine hydrochloride, m.p. 224–226° C., of the formula

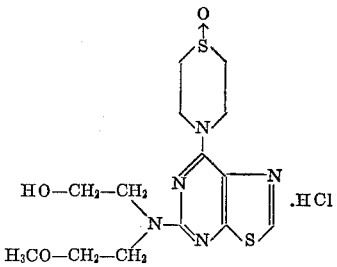

was prepared from 5-chloro - 7 - (1' - oxido - thiomorpholino)-thiazolo[5,4-d]pyrimidine and N-(β-methoxy-ethyl)-ethanolamine.

Example 58

Using a procedure analogous to that described in Example 49, 5-[N-(γ - methoxy-n-propyl)-N-(β-hydroxy-ethyl)-amino] - 7 - (1'-oxido-thiomorpholino)-thiazolo[5,4-d]pyrimidine hydrochloride, m.p. 222–224° C., was prepared from 5-chloro - 7 - (1'-oxido-thiomorpholino)-thiazolo[5,4-d]pyrimidine and N-(γ-methoxy-n-propyl)-ethanolamine.

Example 59

Using a procedure analogous to that described in Example 49, 5-[N-(γ-hydroxy-n-propyl)-N-(β-hydroxy-ethyl)-amino] - 7 - (1'-oxido-thiomorpholino)-thiazolo[5,4-d]pyrimidine, m.p. 226–228° C., was prepared from 5-chloro - 7 - (1'-oxido-thiomorpholino)-thiazolo[5,4-d]pyrimidine and N-(γ-hydroxy-n-propyl)-ethanolamine.

Example 60

Using a procedure analogous to that described in Example 49, 5-[N-(β-hydroxy-ethyl) - N - (5-hydroxy-n-pentyl)-amino] - 7 - (1'-oxido-thiomorpholino)-thiazolo[5,4-d]pyrimidine hydrochloride, m.p. 221–223° S., was prepared from 5 - chloro - 7 - (1'-oxido-thiomorpholino)-thiazolo[5,4-d]pyrimidine and N-(5-hydroxy-n-pentyl)-ethanolamine.

Example 61

Using a procedure analogous to that described in Example 49, 5-[N-(β-hydroxy-ethyl) - N - (6-hydroxy-n-hexyl)-amino] - 7 - (1'-oxido-thiomorpholino)-thiazolo[5,4-d]pyrimidine hydrochloride, m.p. 216–218° C., was prepared from 5-chloro - 7 - (1'-oxido-thiormorpholino)-thiazolo[5,4-d]pyrimidine and N -(6 - hydroxy-n-hexyl)-ethanolamine.

Example 62

Using a procedure analogous to that described in Example 49, 5-[N-methyl-N-(β,γ-dihydroxy-n-propyl)-amino] - 7 - (1'-oxido-thiomorpholino)-thiazolo[5,4-d]pyrimidine hydrochloride, m.p. 235–237° C., of the formula

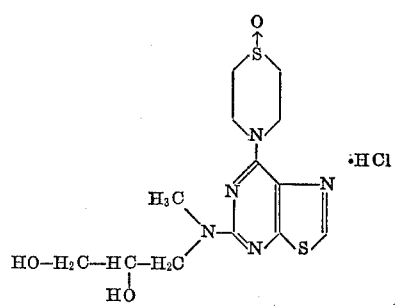

was prepared from 5-chloro-7-(1'-oxido-thiomorpholino)-thiazolo[5,4-d]pyrimidine and N-(β,γ-dihydroxy-n-propyl)-methylamine.

Example 63

Using a procedure analogous to that described in Example 49, 5-[N-cyclohexyl-N-(β,γ-dihydroxy-n-propyl) - amino] - 7 - (1'-oxido-thiomorpholino)-thiazolo-[5,4-d]pyrimidine, m.p. 221-222° C., of the formula

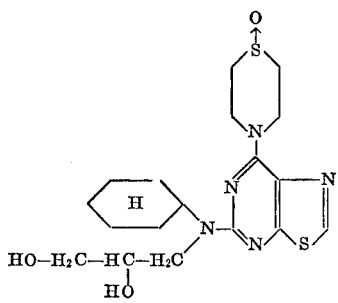

was prepared from 5-chloro-7-(1'-oxido-thiomorpholino)-thiazolo[5,4-d]pyrimidine and N-(β,γ-dihydroxy-n-propyl)-cyclohexylamine.

Example 64

Using a procedure analogous to that described in Example 49, 5-[N-(6-hydroxy-n-hexyl) - N - (β,γ-dihydroxy-n-propyl)-amino] - 7 - (1'-oxido-thiomorpholino)-thiazolo[5,4-d]pyrimidine hydrochloride, m.p. 222-224° C., was prepared from 5-chloro-7-(1'-oxido-thiomorpholino)-thiazolo[5,4-d]pyrimidine and N - (6 - hydroxy-n-hexyl)-N-(β,γ-dihydroxy-n-propyl)-amine.

Example 65

Using a procedure analogous to that described in Example 49, 5-[N-(γ-hydroxy-n-propyl) - N - (β,γ-dihydroxy-n-propyl)-amino] - 7 - (1'-oxido-thiomorpholino)-thiazolo[5,4-d]pyrimidine hydrochloride, m.p. 217-220° C., was prepared from 5-chloro-7-(1'-oxido-thiomorpholino)-thiazolo[5,4-d]pyrimidine and N-(γ-hydroxy-n-propyl)-N-(β,γ-dihydroxy-n-propyl)-amine.

Example 66

Using a procedure analogous to that described in Example 49, 5-(2'',6''-dimethyl-piperazino)-7-(1'-oxido-thiomorpholino) - thiazolo[5,4-d]pyrimidine hydrochloride, m.p. 240-255° C. (decomp.), of the formula

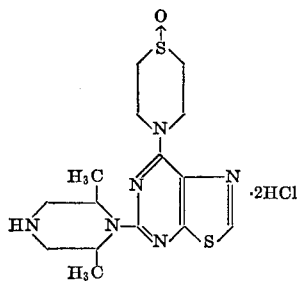

was prepared from 5-chloro-7-(1'-oxido-thiomorpholino)-thiazolo-[5,4-d]pyrimidine and 2,6-dimethyl-piperazine.

Example 67

Using a procedure analogous to that described in Example 49, 5-(2'',5''-dimethyl - piperazino)-7-(1'-oxido-thiomorpholino) - thiazolo[5,4 - d]pyrimidine dihydrochloride, m.p. 212-213° C., was prepared from 5-chloro-7-(1'-oxido - thiomorpholino) - thiazolo[5,4-d]pyrimidine and 2,5-dimethyl-piperazine.

Example 68

5-(N'-carbamido - piperazino)-7-(1' - oxido-thiomorpholino)-thiazolo[5,4-d]pyrimidine, m.p. 261-264° C., of the formula

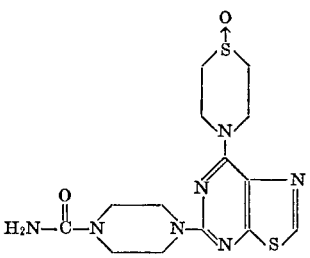

was prepared from 5-piperazino-7-(1'-oxido-thiomorpholino)thiazolo[5,4 - d]pyrimidine dihydrochloride and potassium cyanate in aqueous solution.

Example 69

Using a procedure analogous to that described in Example 49, 5-(N'-formyl-piperazino)-7-thiomorpholino-thiazolo[5,4-d]pyrimidine, m.p. 207-209° C., of the formula

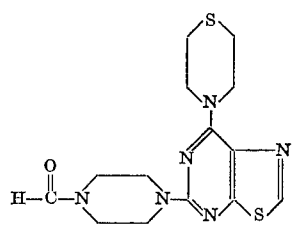

was prepared from 5-chloro-7-thiomorpholino-thiazolo-[5,4-d]pyrimidine and N-formyl-piperazine.

Example 70

Using a procedure analogous to that described in Example 49, 5-N' - formyl-piperazino)-7-(i-oxido-thiomorpholino)-thiazolo[5,4-d]pyrimidine, m.p. 235-238° C., was prepared from 5-chloro-7-(1'-oxido-thiomorpholino)thiazolo[5,4-d]pyrimidine and N-formyl-piperazine.

The compounds of the present invention, that is, those embraced by formula I above and their non-toxic acid addition salts, have useful pharmacodynamic properties. More particularly, the compounds of the instant invention are rapidly orally absorbed and exhibit hypotensive activity and a very strong inhibiting effect upon thrombocyte aggregation and stickiness in warm-blooded animals, such as cats and mice.

The inhibiting action upon thrombocyte aggregation was ascertained by the method of Born and Cross, J. Physiol. 170, 397 (1964), or by the method of K. Breddin, Schweiz. Mer. Wochenschr. 95, 655-660 (1965).

The inhibiting effect upon the platelet stickiness was determined by means of the so-called retention test according to Morris [see E. Deutsch et al., 1. Internationales Symposium über Stoffwechsel und Membranpermeabilität von Erythrocyten and Thrombocyten, Vienna, Austria (1969); Georg Thieme Verlag, Stuttgart, Germany].

The prolonging effect upon the bleeding time was ascertained by the method of Duke, J. Amer. Med. Assoc. 15, 1185 (1910).

The hypotensive tests were performed on anesthetized cats and dogs by the method of Eckenhoff, Amer. J. Physiol. 148, 582 (1947).

The following shows the results obtained from these tests for a number of representative compounds according to the present invention, namely:

A = 5-Piperazino-7-thiomorpholino-thiazolo[5,4-d]pyrimidine dihydrochloride;
B = 5-Piperazino-7-(1'-oxido-thiomorpholino)-thiazolo[5,4-d]pyrimidine dihydrochloride;

C = 5-Piperazino-7-(1',1'-dioxido-thiomorpholino)-thiazolo[5,4-d]pyrimidine dihydrochloride; and D = 5-Diethanolamino-7-(1'-oxido-thiomorpholino)-thiazolo]5,4-d]pyrimidine hydrochloride.

(1) To determine the inhibiting action of the test compound upon thrombocyte aggregation, 1 ml. of human citrate-blood is pipetted into each of a number of small test tubes, and the test compound is added to various final concentrations. The tubes are incubated for 10 minutes at 37° C. 1 gm. of glass beads (glass beads for gas-chromatography) is added to half of the tubes. Finally the closed tubes are attached to a vertical wheel and rotated for 1 minute. By this means good contact is obtained between the glass beads and the blood. The tubes are then allowed to stand at room temperature for another hour, after which time a satisfactory sedimentation of erythrocytes has taken place. 0.01 ml. of the supernatant plasma is removed, diluted to 1:8,000 with celloscope solution, and the platelet count is read in the celloscope. From these data the median effect concentration ($ED_{50}$) of the test compound is calculated, i.e. the concentration in mol/liter which reduces the stickiness (in comparison with the control with glass beads, but without the test compound) by 50%.

| Compound: | $ED_{50}$ (mol/liter) |
|---|---|
| A | $4.56 \times 10^{-6}$ |
| B | $1.7 \times 10^{-7}$ |
| C | $3.43 \times 10^{-6}$ |
| D | $\sim 2.5 \times 10^{-5}$ |

(2) The effect upon thrombocyte aggregation was measured in the platelet-rich plasma of healthy human test subjects, by photometrically ascertaining and registering the rate of decrease of the optical density after addition of adenosine diphosphate (ADP). The angle of inclination of the density curve is a measure of the rate of aggregation. The point on the curve which corresponded to the greatest light-permeability was used for calculation of the optical density.

The ADP-doses were held to a minimum, but still sufficiently large to result in an irreversible aggregation. Prior to addition of ADP, each plasma sample was incubated for 10 minutes at 37° C. with various amounts of the test compound. From the data thus obtained, the median effective amount of test compound ($ED_{50}$), i.e. the concentration which reduces the maximum light-permeability in platelet-rich plasma after addition of ADP by 50%, was calculated.

| Compound: | $ED_{50}$ (mol/liter) |
|---|---|
| A | $6.0 \times 10^{-6}$ |
| B | $2.82 \times 10^{-7}$ |
| C | $3.37 \times 10^{-7}$ |
| D | $1.3 \times 10^{-6}$ |

(3) To determine the effect on the bleeding time, 10 mgm./kg. of the test compound were given per os to non-anesthetized mice. After one or three hours, about 0.5 mm. was cut off from the tail of each animal, and the exuded blood was carefully soaked up with filter paper at intervals of 30 seconds. The number of drops of blood so obtained was used as a measure for the bleeding time compared to untreated animals (5 animals/test).

| Time after severance of tail | Percent prolongation of bleeding time for compound | | | |
|---|---|---|---|---|
| | A | B | C | D |
| 1 hour | 125 | 100 | 108 | 132 |
| 3 hours | 85 | 58 | 105 | 32 |

(4) The hypotensive activity of the test compounds was ascertained after intravenous administration (vena saphena) to cats under chloralose-urethane anesthesia. From the raw data the amount of test compound ($ED_{25}$) was calculated which reduces the median arterial blood pressure by 25%.

| Compound | $ED_{25}$, mgm./kg. i.v. | Duration of effective action, min. |
|---|---|---|
| A | 0–28 | 120 |
| B | 0.01 | >20 |
| C | ~1.00 | 90 |
| D | 0.70 | 120 |

(5) The acute toxicity of the compounds (observation time: 14 days) was determined on mice after oral administration. The $LD_{50}$ was calculated from the percentage of animals which died after different doses within the observation time [see J. Pharmacol. exper. Therap. 96, 99 (1949)].

| Compound: | $LD_{50}$, mgm/kg. p.o. |
|---|---|
| A | 218 |
| B | 300 |
| C | 560 |
| D | >1000 |

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.083 to 1.67 mgm./kg. body weight, preferably 0.16 to 0.84 mgm./kg. body weight. The daily dose rate is from 1.66 to 3.34 mgm./kg. body weight.

The following examples illustrate a few pharmaceutical dosage unit compositions comprising a compound of the present invention as an active ingredient and represent the best modes contemplated of putting the invention into practical use. The part are parts by weight unless otherwise specified.

EXAMPLE 71

Tablets: The tablet composition is compounded from the following ingredients:

| | Parts |
|---|---|
| 5-Piperazino-7-thiomorpholino-thiazolo [5,4-d]pyrimidine dihydrochloride | 30.0 |
| Lactose | 38.0 |
| Potato starch | 26.0 |
| Polyvinylpyrrolidone | 5.0 |
| Magnesium stearate | 1.0 |
| Total | 100.0 |

Preparation: The thiazolopyrimidine salt is intimately admixed with the lactose and the potato starch, the mixture is uniformly moistened with an ethanolic 30% solution of the polyvinylpyrrolidone, the moist mass is forced through a 1.5 mm.-mesh screen, and the resulting granulate is dried at 45° C. and again passed through a 1.0 mm.-mesh screen. The dry granulate thus obtained is admixed with the magnesium stearate, and the composition is compressed into 100 mgm.-tablets in a conventional tablet making machine. Each tablet contains 30 mgm. of the thiazolopyrimidine salt and is an oral dosage unit composition with effective thrombocyte aggregation and stickiness inhibiting action.

Example 72

Coated Pills: The pill core composition is compounded from the following ingredients:

| | Parts |
|---|---|
| 5 - Piperazino-7-thiomorpholino-thiazolo[5,4-d]pyrimidine dihydrochloride | 15.0 |
| Lactose | 14.0 |
| Corn starch | 8.0 |
| Polyvinylpyrrolidone | 2.5 |
| Magnesium stearate | 0.5 |
| Total | 40.0 |

Preparation: The ingredients are compounded in a manner analogous to that described in the preceding example, and the composition is compressed into 40 mgm.-pill cores, which are subsequently coated with a thin shell consisting essentially of a mixture of talcum and sugar and finally polished with beeswax. Each coated pill contains 15 mgm. of the thiazolopyrimidine salt and is an oral dosage unit composition with effective thrombocyte aggregation and stickiness inhibiting action.

Example 73

Hypodermic Solution: The solution is compounded from the following ingredients:

| | Parts |
|---|---|
| 5 - Piperazino - 7-thiomorpholino-thiazolo[5,4-d] pyrimidine dihydrochloride | 10.0 |
| Polyethyleneglycol 600 | 100.0 |
| Distilled water q.s. ad 2000.0 by vol. | |

Preparation: The polyethyleneglycol and the thiazolopyrimidine salt are dissolved in a sufficient amount of distilled water which had previously been boiled and cooled in an atmosphere of nitrogen; the dissolution is also carried out in an atmosphere of nitrogen. The resulting solution is diluted to the indicated volume with additional pretreated distilled water, and the resulting solution is filled, again in an atmosphere of nitrogen, into brown 2 cc.-ampules which are then sterilized for 20 minutes at 120° C. and subsequently sealed. The entire operation must be performed in diffused light. Each ampule contains 10 mgm. of the thiazolopyrimidine salt, and the contents thereof are an injectable dosage unit composition with effective thrombocyte aggregation and stickiness inhibiting action.

Example 74

Drop Solution: The solution is compounded from the following ingredients:

| | Parts |
|---|---|
| 5 - Piperazino - 7-thiomorpholino-thiazolo[5,4-d] pyrimidine dihydrochloride parts | 10.0 |
| Cane sugar do | 350.0 |
| Sorbic acid do | 1.0 |
| Essence of cocoa do | 50.0 |
| Ethyl alcohol parts by vol | 200.0 |
| Polyethyleneglycol 600 do | 100.0 |
| Distilled water q.s. ad 1000.0 parts by volume. | |

Preparation: The sorbic acid is dissolved in the ethanol, the solution is diluted with an equal volume of distilled water, and the thiazolopyrimidine salt is dissolved in the aqueous mixture (solution 1). The cane sugar is dissolved in the remaining amount of distilled water (solution 2). Solution 2, the polyethyleneglycol and the essence of cocoa are stirred into solution 1, and the composition is filtered. The entire operation must be performed in an atmosphere of nitrogen and in diffused light. 1 ml. of the filtrate (about 20 drops) contains 10 mgm. of the thiazolopyrimidine salt and is an oral dosage unit composition with effective thrombocyte aggregation and stickiness inhibiting action.

Analogous results are obtained when any one of the other thiazolopyrimidines embraced by formula I or a non-toxic acid addition salt thereof is substituted for the particular thiazolopyrimidine in Examples 71 through 74. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

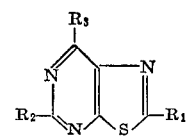

wherein $R_1$ is hydrogen, phenyl or methyl,
$R_2$ is
(a) heterocyclic amino selected from the group consisting of piperazino, where the 4-position is optionally formyl-, acetyl-, benzoyl-, p-toluenesulfonyl-, carbamoyl-, benzyl-, methyl- or hydroxyethyl-substituted; hexahydro-1, 4-diazepino; hexahydro - 1,4-thiazepino; morpholino; thiomorpholino; 1-oxido-thiomorpholino; or 1,1-dioxido-thiomorpholino; where each of these heterocycles may optionally have from one to two methyl substituents attached to ring carbon atoms; or
(b) acyclic amino selected from the group consisting of (hydroxy-ethyl)-amino; di-(hydroxy-alkyl of 2 to 6 carbon atoms)-amino; N-methoxy-alkyl of 2 to 3 carbon atoms)-N-(hydroxyethyl)-amino; N-(dihydroxy-propyl)-N-(lower alkyl)-amino; N-(dihydroxy-lower alkyl)-N-(methyl or cyclohexyl)-amino; N-(dihydroxy-propyl)-N-(hydroxy-alkyl of 2 to 6 carbon atoms)-amino; or N-(amino-ethyl) amino; and $R_3$ is heterocyclic amino selected from the group consisting of piperazino, where the 4-position is optionally carbethoxy-, carbamoyl-, phenethyl- or hydroxy-lower alkyl-substituted; hexahydro-1, 4-diazepino; morpholino; thiomorpholino; 1 - oxido-thiomorpholino; or 1,1-dioxido-thiomorpholino; where each of these heterocycles may optionally have from one to two methyl substituents attached to ring carbon atoms;

or a non-toxic, pharmacologically acceptable acid addition salt thereof.

2. A compound of claim 1, wherein
$R_1$ is hydrogen or methyl,
$R_2$ is piperazino or di-($\beta$-hydroxy-ethyl)-amino, and
$R_3$ is thiomorpholino, 1-oxido-thiomorpholino or 1,1-dioxido-thiomorpholino, or a non-toxic, pharmacologically acceptable acid addition salt thereof.

3. A compound of claim 2, which is 5-piperazino-7-thiomorpholino-thiazolo[5,4-d]pyrimidine or a non-toxic, pharmacologically acceptable acid addition salt thereof.

4. A compound of claim 2, which is 5-piperazino-7-(1'-oxido-thiomorpholino-thiazolo[5,4-d]pyrimidine or a non-toxic, pharmacologically acceptable acid addition salt thereof.

5. A compound of claim 2, which is 5-piperazino-7-(1',1'-dioxido-thiomorpholino-thiazolo[5,4-d]pyrimidine or a non-toxic, pharmacologically acceptable acid addition salt thereof.

References Cited
UNITED STATES PATENTS

| | | | |
|---|---|---|---|
| 3,635,962 | 6/1972 | Wyss | 260—243 B |
| 3,649,631 | 3/1972 | Koppe et al. | 260—243 B |

RICHARD J. GALLAGHER, Primary Examiner

U.S. Cl. X.R.

260—243 R, 247.1, 253, 256.5 R; 424—200, 246, 248, 251, 253